(12) United States Patent
Nichols et al.

(10) Patent No.: US 11,829,491 B2
(45) Date of Patent: *Nov. 28, 2023

(54) SYSTEMS AND METHODS FOR MANAGING ACCESS TO MEDIA ASSETS BASED ON A PROJECTED LOCATION OF A USER

(71) Applicant: ROVI GUIDES, INC., San Jose, CA (US)

(72) Inventors: Michael R. Nichols, La Canada Flintridge, CA (US); Sally Cook, San Jose, CA (US)

(73) Assignee: Rovi Guides, Inc., San Jose, CA (US)

(*) Notice: Subject to any disclaimer, the term of this patent is extended or adjusted under 35 U.S.C. 154(b) by 120 days.

This patent is subject to a terminal disclaimer.

(21) Appl. No.: 17/236,601

(22) Filed: Apr. 21, 2021

(65) Prior Publication Data
US 2021/0264039 A1 Aug. 26, 2021

Related U.S. Application Data

(63) Continuation of application No. 16/549,172, filed on Aug. 23, 2019, now Pat. No. 11,017,101, which is a continuation of application No. 14/580,365, filed on Dec. 23, 2014, now Pat. No. 10,438,009.

(51) Int. Cl.
*G06F 21/60* (2013.01)

(52) U.S. Cl.
CPC .... *G06F 21/604* (2013.01); *G06F 2221/2111* (2013.01)

(58) Field of Classification Search
CPC .............. G06F 2221/2111; G06F 21/604
See application file for complete search history.

(56) References Cited

U.S. PATENT DOCUMENTS

| | | | |
|---|---|---|---|
| 8,538,376 B2 | 9/2013 | Lee | |
| 8,843,953 B1 | 9/2014 | Dang | |
| 9,262,596 B1* | 2/2016 | Steiner | G06F 21/6245 |
| 9,342,597 B1 | 5/2016 | Tomkins | |
| 9,571,504 B2 | 2/2017 | Peterson | |
| 10,063,901 B2 | 8/2018 | Nichols | |
| 10,438,009 B2 | 10/2019 | Nichols | |
| 2003/0005135 A1 | 1/2003 | Inoue | |
| 2003/0126600 A1 | 7/2003 | Heuvelman | |
| 2007/0186231 A1 | 8/2007 | Haeuser | |
| 2008/0148310 A1 | 6/2008 | Strickland | |
| 2008/0289007 A1* | 11/2008 | Malik | G06F 21/6218 726/4 |
| 2008/0320558 A1 | 12/2008 | Imanishi | |
| 2009/0254656 A1 | 10/2009 | Vignisson | |

(Continued)

*Primary Examiner* — Hee K Song
(74) *Attorney, Agent, or Firm* — HALEY GUILIANO LLP

(57) ABSTRACT

Methods and systems are disclosed herein for a media guidance application that allows access restrictions to be modified in a flexible manner based on a deviation in a user's projected location. Specifically, the media guidance application determines at an end of a first time period whether a user is in a projected location for a second time period. If the user is in a projected location for the second time period, the media guidance application sets a second level of media access restriction. However, if the media guidance application determines that the user is not in the projected location for the second time period, the media guidance application maintains the first level of media access restriction.

20 Claims, 6 Drawing Sheets

(56) References Cited

U.S. PATENT DOCUMENTS

| | | |
|---|---|---|
| 2011/0105077 A1 | 5/2011 | Chandrasekaran |
| 2013/0212618 A1 | 8/2013 | Schultz |
| 2013/0225151 A1 | 8/2013 | King |
| 2013/0297706 A1 | 11/2013 | Arme |
| 2013/0339991 A1 | 12/2013 | Ricci |
| 2014/0007154 A1 | 1/2014 | Seibold |
| 2014/0026160 A1 | 1/2014 | Shrum |
| 2014/0059608 A1 | 2/2014 | Beattie |
| 2014/0181910 A1 | 6/2014 | Fingal |
| 2014/0215635 A1 | 7/2014 | Neuenschwander |
| 2014/0274122 A1 | 9/2014 | Tseng |
| 2015/0089599 A1 | 3/2015 | Vignisson |
| 2015/0112919 A1 | 4/2015 | Weir |
| 2015/0215186 A1 | 7/2015 | Alonso Franco |
| 2016/0029085 A1 | 1/2016 | Mountain |
| 2016/0080510 A1 | 3/2016 | Dawoud |
| 2016/0180108 A1 | 6/2016 | Nichols |
| 2016/0182934 A1 | 6/2016 | Nichols |
| 2016/0203442 A1 | 7/2016 | Pererira |
| 2016/0205238 A1 | 7/2016 | Abramson |
| 2016/0300070 A1 | 10/2016 | Durham |
| 2020/0050776 A1 | 2/2020 | Nichols |

\* cited by examiner

800

802
Receive Input from a First User to Set a First Level of Access Restriction to Media Content

804
Receive a Communication from the First User, Wherein the Communication from the First User is Published to a Second User

806
Determine, Based on the Communication, that the First Level of Access Restriction is to be Modified

808
Modify, Based on the Communication, the First Level of Access Restriction

FIG. 8

SYSTEMS AND METHODS FOR MANAGING ACCESS TO MEDIA ASSETS BASED ON A PROJECTED LOCATION OF A USER

CROSS-REFERENCE TO RELATED APPLICATIONS

This application is a continuation of U.S. patent application Ser. No. 16/549,172, filed Aug. 23, 2019, which is a continuation of U.S. patent application Ser. No. 14/580,365, filed Dec. 23, 2014, now U.S. Pat. No. 10,438,009, the disclosures of each of which are hereby incorporated by reference herein in their entireties.

BACKGROUND

In conventional systems, various tools are currently available to control access to media assets. These tools include methods of setting access restrictions on media content for specific periods of time. However, the media access restrictions are limited to basing restrictions solely on the content of media assets and require users to manually adjust the restrictions whenever the user wishes to change the restrictions.

SUMMARY

Accordingly, methods and systems are described herein for a media guidance application that automatically modifies access restrictions to media content in a flexible manner based on the criteria of a user. In particular, the media guidance application may automatically modify access restrictions based on whether or not the user is in a particular location, or projected to be in a particular location, during specific time periods.

For example, the media guidance application may, through various techniques, determine whether or not a user is in a projected location for a particular time period. If the user is not in his projected location, the media guidance application may maintain current media access restrictions. If the user is in his projected location, the media guidance application may modify access restrictions to the media content. For example, a parent may have set restrictions on what programs her children are allowed to watch between the time they get home from school and the time she gets home from work. During a usual day, the children may get home from school at 3 PM, but the parent may not get home until 6 PM. During the time period between 3 PM and 6 PM, programs that are not appropriate for children may be restricted. However, at 6 PM, all restrictions may be lifted because the parent came home. Some days, the parent may not get home exactly at 6 PM. Therefore, the media guidance application may maintain the restrictions on media content until the parent arrives home.

The media guidance application may determine whether or not a user is in a projected location and/or whether or not access restrictions should change for a particular time period by analyzing content generated by a user or content about the user. For example, a user may be going on vacation and, as a result, may set access restrictions on media content before leaving on vacation. However, while on vacation, a user may send an SMS message with the text: "Thank you for staying at my house with my dog while I am away on vacation." While the message may not instruct the media guidance application as to the location of a user and/or whether or not the media guidance application should modify the access restrictions, the media guidance application, based on the content and context of the message (e.g., in this case indicating that the home will be occupied) may cause the media guidance application to automatically, without additional user inputs, modify the access restrictions.

In some aspects, the media guidance application may set, for a first time period, a first level of access restriction to media content. For example, the media guidance application may set a restriction to media content where access to media assets including violent conduct may be restricted between the hours of 9 AM and 6 PM, which may correspond to a time period when a parent is not home.

The media guidance application may determine, for a second time period, a second level of access restriction to the media content based on a projected location of a user during the second time period, wherein the second time period is different from and, consecutively, follows the first time period. For example, the media guidance application may determine that after 6 PM, which may correspond to a time when a parent arrives home, media assets including violent conduct may not be restricted. For example, after the parent arrives home, the parent does not need to rely on the access restrictions to prevent a child from consuming objectionable content.

The media guidance application may then determine that an end of the first time period has been reached. For example, the media guidance application may include an internal clock or counter mechanism that determines the current time. The media guidance application may continually compare the determined current time to times associated with the access restrictions. For example, at 6 PM the media guidance application may determine that the time period of 9 AM to 6 PM has ended and, thus, under normal circumstances the access restrictions should be lifted.

The media guidance application may also, in response to determining that the end of the first time period has been reached, determine whether or not a user is in a different location than the projected location. For example, the media guidance application may determine that a user's projected location at 6 PM is inside the user's home (e.g., corresponding to the user returning home). However, the media guidance application may determine that the user's potential location, at 6 PM, is inside an electronics store (e.g., as determined based on information indicating the potential whereabouts of the user). As a result the media guidance application may determine that the user is not in her projected location.

The media guidance application may, in response to determining that the user is in a different location than the projected location at the end of the first time period, maintain the first level of access restriction. For example, the media guidance application may determine that while a user is projected to be at home at 6 PM, the user is instead at a restaurant. Because the user is at the restaurant, the media guidance application may maintain the same level of access restrictions to the media content as during the prior consecutive time period.

Alternatively, the media guidance application may, in response to determining that the user is in the projected location at the end of the first time period, replace the first level of access restriction with the second level of access restriction. For example, if the media guidance application determines that the user is projected to be at home at 6 PM, the media guidance application may change media access restrictions from the first level to the second level.

In some embodiments, the media guidance application may, during the second time period and subsequent to determining that the user is in a different location than the projected location, determine that the user entered the projected location and in response to determining that the user entered the projected location, automatically replace the first level of access restriction with the second level of access restriction. For example, if a user is scheduled to leave his home at 2 PM for a doctor's appointment and the user is expected to be back at home at 3 PM, the media guidance application may restrict access to media content for the time period between 2 PM and 3 PM. However, if the media guidance application detects that the user has not returned home at 3 PM, the media guidance application may maintain the same level of access restriction to media content after 3 PM. When the user returns home, for example at 3:30 PM, the media guidance application may detect the user's return and set access restrictions to media content in the same manner as it would have done at 3 PM if the user returned home at the scheduled time.

In some embodiments, the media guidance application may, when maintaining the first level of access restrictions during the second time period, notify the user that the first level of access restrictions will be maintained when the second time period begins. For example, as described above, the user may be projected to be back at home at 3 PM after a doctor's appointment. However, the user may have stopped at a supermarket after the doctor's appointment and has not returned home by 3 PM as planned. As a result, the media guidance application may send a notification to the user's smart phone to inform the user that the access restrictions to media content will be maintained.

In some embodiments, the media guidance application may provide an option to the user to override the maintaining of the first level of access restriction and in response to the user selecting the option, replace the first level of access restriction with the second level of access restriction. For example, if the user is in a supermarket as described above and the media guidance application notifies the user via her smart phone that the first level of media access restriction will be maintained, the media guidance application may also give the user an option to instruct the media guidance application to proceed with the second level of access restriction as initially scheduled.

In some embodiments, the media guidance application may provide, to the user, an option to modify the second time period and, in response to the user selecting the option, modify the second time period for a duration specified by the user. For example, a user may be at a baseball game and the user is scheduled to be home at 9 PM. However, the baseball game may be going into extra innings and the user will not be home until 10 PM. When she gets a notification that a first level of access to the media content will be maintained because the baseball game is going into extra innings, the media guidance application may provide, to the user, an option to delay the start of the second time period to 10 PM.

In some embodiments, the media guidance application may deny access to a media asset during the second time period, wherein the media asset is restricted under the first level of access restriction and is unrestricted under the second level of access restriction and notify a party that is attempting to access the media asset that access to the media asset is restricted because the user is not at the projected location. For example, if the user goes to dinner and is projected to be home at 8 PM, the media guidance application may determine that at 8 PM access restrictions to media content will change. However, if the user does not return home until after 9 PM, the access restrictions are not changed. If at 8:05 PM the user's child attempts to watch a show that is restricted under the first level of access restrictions and is unrestricted under the second level of access restriction, the media guidance application may not allow the child to watch the show and may generate for display a notification to the child that she is not allowed to watch the show because a parent is not at home.

The media guidance application may use various techniques to project a location of a user such as determining the projected location of a user based on short message service, multimedia messaging service, a calendar application, and/or a section of a website associated with the user. For example, the media guidance application may retrieve a potential location of the user from a calendar application that projects the user to be home at 5 PM after a business meeting. However, if the media guidance application determines that the business meeting is now scheduled to end at 5:30 PM, based on calendar information, the media guidance application may determine that the user is not in her projected location.

In another example, the media guidance application may determine a potential location of the user based on a publication of the user (e.g., to another user). For example, the user may send a Short Message Service ("SMS") message to his friend with a text "Going drinking after work. Are you in?" In response to the SMS message, the media guidance application may determine that the user will not be home on time and, therefore, the user's projected location will be different then the user's location.

In another example, the user may, instead of sending an SMS message to her friend as in the example above, post the same message on her Facebook® page. The media guidance application may retrieve that message and analyze the contents of the message. Based on the message, the media guidance application may determine that the user is not in her projected location after work.

In some aspects, the media guidance application may receive input from a first user setting a first level of access restriction to media content. For example, a user may restrict access to violent media content and to media content that requires extra payment in order to access it.

The media guidance application may detect a communication from the first user, wherein the communication from the first user is published to a second user. For example, the user may post a message on her Facebook® page containing the text: "I am so glad I found a house-sitter for the time I will be on vacation." The media guidance application may monitor the Facebook® page of the user and thus detect that post.

The media guidance application may then determine, based on the communication, that the first level of access restriction should be modified. For example, based on the detected post, the media guidance application may determine to modify the media access restrictions for violent media content. Additionally or alternatively, the media guidance application may determine that the access restrictions, or a portion thereof, should not be modified. For example, the media guidance application may determine that access restrictions related to media content requiring an extra charge should not be modified.

The media guidance application may then modify, based on the communication, the first level of access restriction. For example, if the media guidance application determines, in the example above, the access to violent content need not be restricted, it may only set access restriction to content that requires an extra charge to consume.

In some embodiments, media guidance application may determine whether or not the detected communication includes a command to modify the first level of access restriction. For example, the media guidance application may detect an SMS message (e.g., "Please allow access to violent content.") that indicates a command to modify the restrictions to violent content, but maintains (or does not explicitly request modification of) the restrictions to media content that requires an extra charge.

In some embodiments, detecting the communication from the user comprises periodically querying a database comprising published communications of the user. For example, the media guidance application may have access to a database that stores all of the user's published communications. The database may be stored on the same device where the media guidance application is active or it may be stored at a different location. The media guidance application may query the database every five minutes to determine if the user's new published communications are available.

In some embodiments, the media guidance application may notify the user that the first level of access restriction will be modified. For example, the media guidance application may notify the user, via the user's smart phone, of the modification. Furthermore, in some embodiments, the media guidance application may provide an option to the user to override the modification of the first level of access restriction and in response to the user selecting the option, maintain the first level of access restriction. For example, the media guidance application may notify the user that media content access restrictions of the example above will be relaxed based on the user finding a house-sitter. However, the user may not want the modification to take place. As a result, the media guidance application may give the user an option to keep the first level of access. If the user selects the option, access to violent content may still be restricted.

In some embodiments, the media guidance application may notify the user that the first level of access restriction will be maintained. Based on the example above, the media guidance application may send a confirmation to the user that access restrictions to violent content will be maintained.

In some embodiments, the media guidance application may provide, to the user, an option to delay the modification of the first level of access restriction and, in response to the user selecting the option, delaying the modification of the first level of access restriction for a time period specified by the user. For example, the user may be renting a home he owns to different people throughout the year. He may charge people extra rent for access to premium media content. As a result, when one user moves out and a second user moves in different levels of access restrictions may be set to media content. For example, a media guidance application may determine that a new renter is to move into the home in three days and that the new renter paid for access to premium media content. As a result, the media guidance application may send a notification to the user informing the user that it will be allowing access to premium content in three days. The notification may also contain an option to delay the change. Additionally, the new renter may have informed the user that he will not be moving into the home for five days. As a result, the user may send back an instruction to the media guidance application to modify access restrictions to media content five days from today, instead of three days from today.

In some embodiments, the media guidance application may allow access to a media asset after the modification of the first level of access restriction, wherein the media asset is restricted under the first level of access restriction and is unrestricted after the modification of the first level of access restriction and notify a party that is attempting to access the media asset that access to the media asset is granted because access restrictions were relaxed. In the example above, if the user does not delay the modification of media content, and the current tenant tries to access premium content, access to premium content will be granted. The media guidance application may also notify the tenant that granted restrictions were relaxed.

In some embodiments, the media guidance application may retrieve the communication, determine, based on the contents of the communication, a second level of access restriction to the media content, and set the second level of access restriction. For example, the media guidance application may retrieve the text of an SMS message that reads: "I am so excited I found a baby sitter for my daughter while I am going to be on vacation." The media guidance application may analyze the message and determine that access restrictions to media assets need to be relaxed and then relax those restrictions once the user goes on vacation.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 is a flowchart of illustrative steps involved in modifying access to media content based on the user's published communications in accordance with some embodiments of the disclosure.

DETAILED DESCRIPTION

Figure 1:
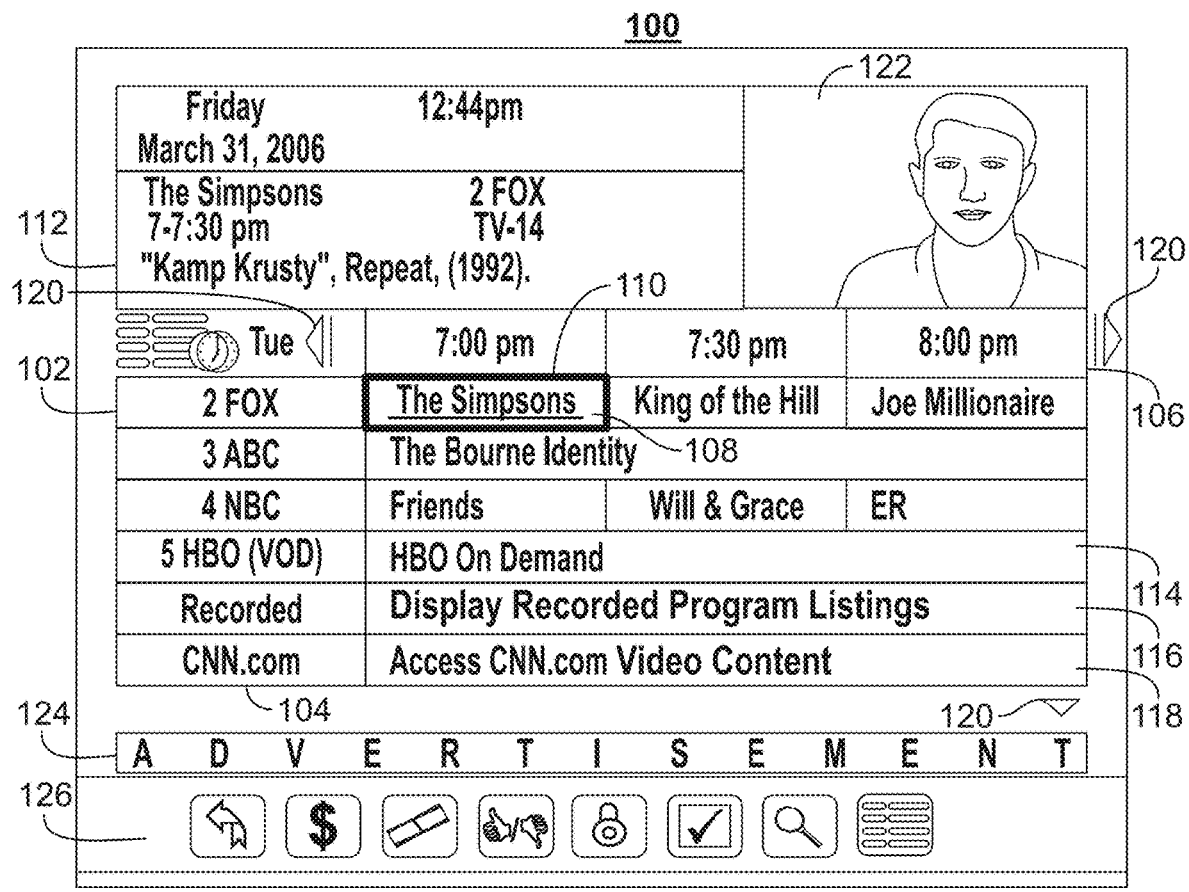
FIG. 1 shows an illustrative embodiment of a display screen that may be used to provide media guidance application listings and other media guidance information, in accordance with some embodiments of the disclosure.

Methods and systems are described herein for a media guidance application that automatically modifies access restrictions to media content in a flexible manner based on the criteria of a user. In particular, the media guidance application may automatically modify access restrictions based on whether or not the user is in a particular location, or projected to be in a particular location, during specific time periods.

As referred to herein, a "media guidance application" or a "guidance application" is an application that provides media guidance data to a user through an interface. For example, a media guidance application may allow users to efficiently navigate content selections and easily identify content that they may desire. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The media guidance application may be implemented and/or transmit instruction to a user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

The media guidance application may, through various techniques, determine whether or not a user is in a projected location for a particular time period. If the user is not in his projected location, the media guidance application may maintain current media access restrictions. If the user is in his projected location, the media guidance application may modify access restrictions to the media content. For example, a parent may have set restrictions on what programs her children are allowed to watch between the time they get home from school and the time she gets home from work. During a usual day, the children may get home from school at 3 PM, but the parent may not get home until 6 PM. During the time period between 3 PM and 6 PM, programs that are not appropriate for children may be restricted. However, at 6 PM, all restrictions may be lifted because the parent came home. Some days, the parent may not get home exactly at 6 PM. Therefore, the media guidance application may maintain the restrictions on media content until the parent arrives home.

The media guidance application may determine whether or not access restrictions should change for a particular time period by analyzing content generated by a user or content about the user. For example, while a user is at work, the media guidance application may assign a first level of access restrictions. However, a microblog transmitted by the user may indicate that the user has friends staying at his home. While the message may not instruct the media guidance application to modify the access restrictions, the media guidance application, based on the content and context of the message (e.g., in this case indicating that the home will be occupied) may cause the media guidance application to automatically, without additional user inputs, modify the access restrictions.

As referred to herein, an "access restriction" is any restriction on what content may or may not be consumed by a user on a device. In some embodiments, access restrictions may be time dependent. That is, whether or not an access restriction applies, and/or what media content the access restriction applies to, may depend on the current time. In some embodiments, access restrictions may depend on particular criteria. For example, whether or not an access restriction applies, and/or what media content the access restriction applies to, may depend on whether or not particular criteria (e.g., the location of a user) is met.

For example, in some embodiments, the media guidance application may set, for a first time period, a first level of access restriction to media content. The first time period may correspond to a time (e.g., 9 AM to 6 PM) during which a user is at work. Another period, which may correspond to the same (or different) access restrictions may be from 2 PM to 4 PM on Saturday, which corresponds to a time when the user is at the gym.

The access restrictions may block and/or otherwise restrict access to content based on a comparison of characteristics of the content to the access restrictions. In one example, the media guidance application compares ratings information associated with a media asset to determine whether or not the access restriction should prevent the media asset from being shown. For example, the media guidance application may retrieve, from media guidance data source 418 (FIG. 4), media asset ratings for each media asset available for the user. The media asset ratings may include several categories. For example, one category may be media assets that are appropriate for a person of any age. Another category may be media assets appropriate for only individuals thirteen years of age or above and yet another category may be media assets appropriate for only individuals 17 years or older. The media guidance may determine that the first level of access restrictions may be set to deny access to any media assets that are for individuals 17 years of age or older. If the user has children that are under 17, the media guidance application may deny access to programs that are not appropriate for children under seventeen years old while the user is not at home.

In another example, the media guidance application may receive input from the user of media assets that the user wishes to restrict access under the first level of access restriction to media assets. The user input may include, for example, specific channels, specific media assets, specific types of media assets, etc. Types of media assets may include media assets with violent content, adult language, etc. The media guidance application may, for example, receive input from the user specifying that all violent content may be restricted along with adult content while the user is not at home.

In another example, the media guidance application may have pre-created access restrictions levels that may be retrieved from a content provider or from a third party. The media guidance application may allow the user to choose different levels of access restrictions for different time periods.

In some embodiments, the media guidance application may determine, for a second time period, a second level of access restriction to the media content based on a projected location of a user during the second time period, wherein the second time period is different from and, consecutively, follows the first time period. A "projected location" of the user as defined herein is a location where the user is found at a specific time under normal circumstances. For example, the media guidance application may include a default schedule of the user that indicates where and when a user can be found. The default schedule may be based on active (e.g., manual user entries identifying a schedule) or passive (e.g., analyzing content describing the position of the user) monitoring of the user.

For example, the media guidance application may determine (e.g., based on entries of a user into a calendar application) that the user is scheduled to be at home until 2 PM on Saturday and then leave his home to go to an athletic club and return at 4 PM. Based on that determination, the media guidance application may determine that the projected location of the user is the user's home until 2 PM on Saturday, the athletic club between 2 PM and 4 PM and then again the user's home after 4 PM. As a result, the media guidance application may determine that access to media assets that require an additional charge may be restricted starting at 2 PM and the restriction may last until 4 PM.

The media guidance application may determine the projected location of the user in various ways by analyzing the content and context of data generated by the user and data generated about the user. For example, an object recognition module incorporated into and/or access by the media guidance application may use multiple types of optical character recognition and/or fuzzy logic, for example, when processing keyword(s) retrieved from data (e.g., textual data, translated audio data, user inputs, etc.). For example, the compare social media site webpage posts, microblog entries, and/or other data generated by or about the user. The media guidance application may further use a search function and/or fuzzy logic. For example, using fuzzy logic, the media application (e.g., via a content recognition module or algorithm incorporated into, or accessible by, the media guidance application) may determine two fields and/or values to be identical even though the substance of the data or value (e.g., two different spellings of a potential destination) is not identical.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

In some embodiments, the content recognition module or algorithm may also include speech recognition techniques, including, but not limited to, Hidden Markov Models, dynamic time warping, and/or neural networks (as described above) to translate spoken words into text and/or processing audio data. For example, the content recognition module may listen for sounds that may indicate a user is going to, or will be at, a particular location.

In some embodiments, the media guidance application may determine whether or not a user is at a location based on whether or not the user is carrying or wearing a user device. For example, the media guidance application may use a global positioning system to determine where a user or user device held by the user is currently located. Furthermore, the media guidance application may cross-reference a database that indicates particular locations with respect to a global positioning coordinate. For example, the media guidance application may receive a map or floor plan (e.g., inputted by the user or received from a remote source) that described the geographic limits of each location. The media guidance application may then cross-reference global position coordinates received from a device to determine whether or not the user or the device is at a location.

Additionally, the media guidance application may compare the coordinates of a user's current position to determine whether or not the user will likely be at a scheduled location. For example, if the user's schedule indicates that the user should be home in five minutes, but the media guidance application determines a user is currently a hundred miles away, the media guidance application may update the projected location of the user.

In some embodiments, the media guidance application may use a motion-detecting system to determine whether or not a user is at a location. In response to detecting that a user has entered a location, the media guidance application may update the current and projected location of the user.

In another example, the media guidance application may determine that a user and/or user device has entered a viewing area based on whether or not the user device is acknowledged and/or verified. For example, the media guidance application may determine whether or not a user device associated with a user is currently connected to a Wi-Fi network at the location. If so, the media guidance application may determine the user device, and, thus, the user is at the location.

In another example, the media guidance application may determine that a user and/or user device has entered a viewing area using object recognition. For example, the media guidance application may incorporate and/or have access to a content recognition module. The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique to monitor the appearance (or lack thereof) of one or more users and/or user devices. For example, the media application may receive data in the form of a video of the location. The video may include a series of frames. For each frame of the video, the media application may use a content recognition module or algorithm to detect the users in each of the frames or series of frames.

In another example, the media guidance application may have access to SMS messages sent and received by the user. The media guidance application may gain access to those messages by being active on the user's smart phone and/or another device with access to the user's SMS messages. If the media guidance application retrieves a message from the user to a friend with text: "Going to the athletic club on Saturday at 2 PM. Meet me there.", the media guidance application may determine that the user is going to leave his home at 2 PM. If the media guidance application also retrieves a message from the user to his son with text: "Going to be home at 4 PM.", the media guidance application may determine that the user will return home at 4 PM.

The media guidance application may also determine the projected location of the user by accessing the user's MMS messages. For example, the user may send a message to his friend with a picture of himself exercising and a time. The media guidance application may receive that message and based on the message, determine that the user is going to go to the athletic club at the specified time. For example, the media guidance application may determine the content (e.g., a picture of the user exercising) and the context (e.g., informing the friend the user will be exercising at a particular time) of the MMS message. In another example, if the media guidance application receives another message from a user to his son with a picture that shows two people having a meal at home with a specific time, the media guidance application may determine that the user may return home by that time for dinner.

The media guidance application may also determine the projected location of the user by accessing the user's calendar application. The media guidance application may retrieve an entry from the user's calendar that indicates that the user is scheduled to be at the athletic club at 2 PM and the entry may have the ending time of 4 PM.

The media guidance application may also determine the projected location of the user by retrieving a section of a website associated with the user and determining that a user posted a new communication within the section about the user's upcoming activities. For example, a user may have a Facebook® page associated with him. The user may post a message on his Facebook® page that states that he is going to a local bar at a certain time and will stay there for a certain amount of time.

In some embodiments, the media guidance application may, in response to determining that the end of the first time period has been reached, determine whether the user is in a different location than the projected location. For example, the media guidance application may be active on a device illustrated by FIG. 3. The media guidance application may, via control circuitry 306, determine what the current time is. The media guidance application may also retrieve from storage 308 time periods and their corresponding levels of media access restrictions. The media guidance application may determine that the first time period has ended and the second time period is about to begin.

In some embodiments, the media guidance application may, in response to determining that the end of the first time period has been reached, determine whether the user is in a different location than the projected location. The ways in which the media guidance application may determine the user's projected location have been described above. The media guidance application may determine the user's location in the same way as it determines the user's projected location. For example, the media guidance application may retrieve user's new SMS and MMS messages where the user may be indicating that, instead of going to be home at 6 PM, the user is going to a bar after work. The media guidance application may also retrieve an SMS or an MMS message from the user to a friend indicating that the user will be skipping the athletic club on a particular Saturday. The media guidance application may also retrieve a post on the user's Facebook® page that he will be missing his scheduled time at the athletic club and determine the user's deviation in the schedule based on the message. Additionally or alternatively, the media guidance may retrieve a calendar item from the user's calendar application in order to determine that the user is going to deviate from his schedule.

In some embodiments, the media guidance application may, in response to determining that the user is in a different location than the projected location at the end of the first time period, maintain the first level of access restriction. For example, the media guidance application may determine that a parent is projected to be home at 6 PM every night after work. However, the media guidance application may determine that the parent has stopped at a supermarket and that, at 6 PM, the parent is not in his home. If, for example, the media guidance application may have previously set restrictions to media assets that include violent content, the media guidance application may not remove those restrictions based on the parent not being home on time.

In some embodiments, the media guidance application may, in response to determining that the user is in the projected location at the end of the first time period, replace the first level of access restriction with the second level of access restriction. For example, if the media guidance application in the example above determines that the user is at home at 6 PM, the media guidance application may remove access restrictions to media assets including violent content.

In some embodiments, the media guidance application may, during the second time period, and subsequent to determining that the user is in a different location than the projected location, determine that the user entered the projected location and, in response to determining that the user entered the projected location, automatically replace the first level of access restriction with the second level of access restriction. Similar to the above example, if the media guidance application determines that the user is going to be late coming home after a doctor's appointment, based on the user's GPS location, the media guidance application may maintain the same level of access to media assets as when the user is not at home. However, the media guidance application may subsequently determine that the user came home and, based on the user coming home, the media guidance application may set the second level of access restrictions to media assets.

Figure 3:
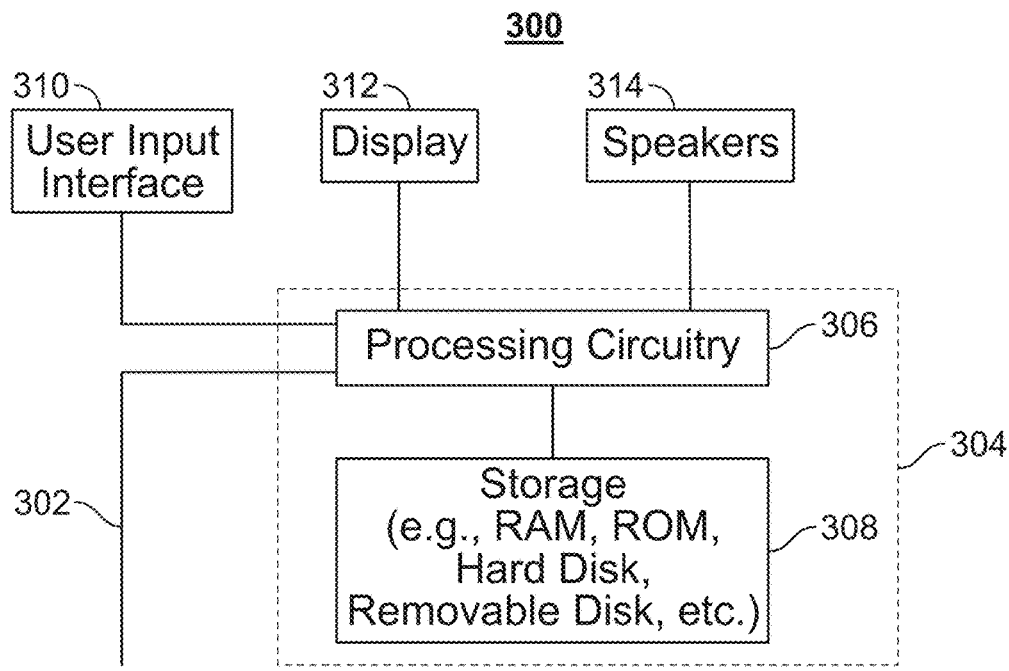
FIG. 3 is a block diagram of an illustrative user equipment device in accordance with some embodiments of the disclosure.
Figure 4:
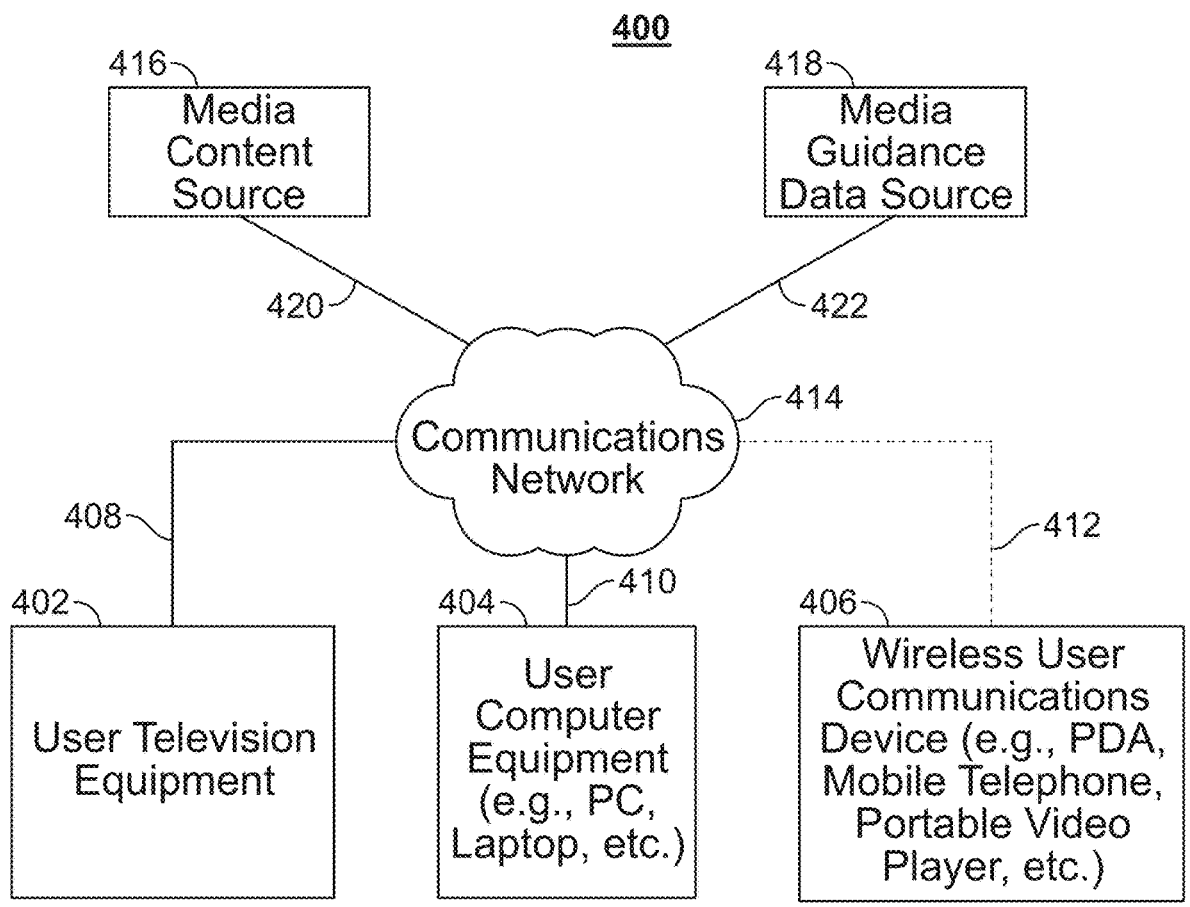
FIG. 4 is a block diagram of an illustrative media system in accordance with some embodiments of the disclosure.

In some embodiments, determining whether the user is in a different location than the projected location comprises periodically querying a database comprising location information of the user. For example, the media guidance application may retrieve and store all of user's SMS messages, MMS messages, calendar items and publications by the user to a database. The database may be located on the same device that the media guidance application is active on (e.g., device of FIG. 3). The database may also be located at media guidance data source 418 (FIG. 4). The database may be periodically updated. The media guidance application may query the database at the end of every time period in order to determine if an updated location has been determined. Alternatively or additionally, the media guidance application may query the database at regular time intervals in order to retrieve any updates before the end of a first time period.

In some embodiments, when maintaining the first level of access restriction during the second time period, the media guidance application may notify the user that the first level of access restriction will be maintained when the second time period begins. For example, the media guidance application may determine that an access restriction to media assets that require an extra charge to consume will be maintained because the user has not returned home at a scheduled time. The media guidance application may also determine that the user has a device associated with him that the user keeps in his possession throughout the day (e.g., a smart phone or an electronic tablet). Based on those determinations, the media guidance application may generate for display on the device in the user's possession a notification that an access restriction to media assets that require an extra charge to consume will be maintained because the user has not returned home.

In some embodiments, the media guidance application may deny access to a media asset during the second time period, wherein the media asset is restricted under the first level of access restriction and is unrestricted under the second level of access restriction and notify a party that is attempting to access the media asset that access to the media asset is restricted because the user is not at the projected location. For example, if the user is late getting home from work, the user's kids may try to access content that includes adult language. As a result, the media guidance application may notify the kids that access to the media asset is still restricted because the user is not home yet.

In some embodiments, the media guidance application may receive input from a first user to set a first level of access restriction to media content. For example, the media guidance application may provide to the user, via display 312 (FIG. 3), a selectable set of options where the user may choose media content that the user wishes to restrict access to. For example, the media guidance application may receive from the user a set of channels to which the user wishes access restrictions to be set. Additionally or alternatively, as described above, the media guidance application may allow a user to set access restrictions to media content based on a rating of the media content.

In some embodiments, the media guidance application may receive a communication from the first user, wherein the communication from the first user is published to a second user. For example, as described above, a communication from the first user that is published to second user may be an SMS message, an MMS message, a calendar application item, or an update to a section of a website associated with the user that the media guidance application may retrieve and analyze.

In some embodiments, the media guidance application may determine, based on the communication, that the first level of access restriction is to be modified. For example, the media guidance application may determine that a user may have two homes. The user may be living in one home for one time period and in another home for another time period. When the user leaves one home, he may set a first level of access restriction to media content in the home. For example, the user may restrict access to all on-demand content and pay-per-view content while the user is away from the home. The media guidance application may further determine that a user may have a guest in a home that the user is currently away from. The communication may be an SMS message from the user to his guest. As a result, the media guidance application may determine that a first level of access restriction needs to be modified. For example, the media guidance application may determine that restrictions for consuming on-demand content need to be lifted, but restrictions for consuming pay-per-view content need to remain in place.

In some embodiments, the media guidance application may modify, based on the communication, the first level of access restriction. If the media guidance application determines that access to media content needs to be modified, it may do so by allowing the guest access to on-demand media content.

In some embodiments, the communication from the first user does not comprise a command to modify the first level of access restriction. For example, the user may not send an SMS message that contains the text: "Please allow on-demand content to be accessed while I am away."

In some embodiments, receiving the communication from the user comprises periodically querying a database comprising published communications of the user. For example, as described above, the media guidance application may have access to database containing all of the user's communications. As a result, the media guidance application may query the database in order to get an update of user's communications. The media guidance application may query a database that resides on the same device as the media guidance application (e.g., FIG. 3). The database may also reside at the media guidance data source 418 (FIG. 4) and may be accessed by the media guidance application over communications network 414.

In some embodiments, the media guidance application may notify the user that the first level of access restriction will be modified. For example, as described above, the media guidance application may notify the user through a device in the possession of the user (e.g., a smart phone or an electronic tablet).

In some embodiments, the media guidance application may provide an option to the user to override the modification of the first level of access restriction and, in response to the user selecting the option, maintain the first level of access restriction. For example, the media guidance application may also generate for display an option on a device in possession of the user (e.g., a smart phone or an electronic tablet) for the user to instruct the media guidance application not to allow the guest access to on-demand content.

In some embodiments, the media guidance application may notify the user that the first level of access restriction will be maintained. For example, if the media guidance application determines that the user choose to maintain access restrictions to on-demand content, the media guidance application may confirm to the user that it will maintain the first level of media access restriction.

In some embodiments, the media guidance application may provide, to the user, an option to delay the modification of the first level of access restriction and in response to the user selecting the option, delay the modification of the first level of access restriction for a time period specified by the user. For example, the media guidance application may generate for display on a device in possession of the user (e.g., a smart phone or an electronic table) an option for the user to delay allowing access to on-demand content until the guest actually arrives at the uninhabited home of the user. If the media guidance application determines that the user has chosen to delay the modification for a specific amount of time, the media guidance application may delay the modification as the user requested.

In some embodiments, the media guidance application may allow access to a media asset after the modification of the first level of access restriction, wherein the media asset is restricted under the first level of access restriction and is unrestricted after the modification of the first level of access restriction and notify a party that is attempting to access the media asset that access to the media asset is granted because access restrictions were relaxed. For example, the media guidance application may generate for display an overlay when a user selects a media asset for consumption notifying the user that access will be granted based on a modified level of access restrictions to media assets.

Figure 2:
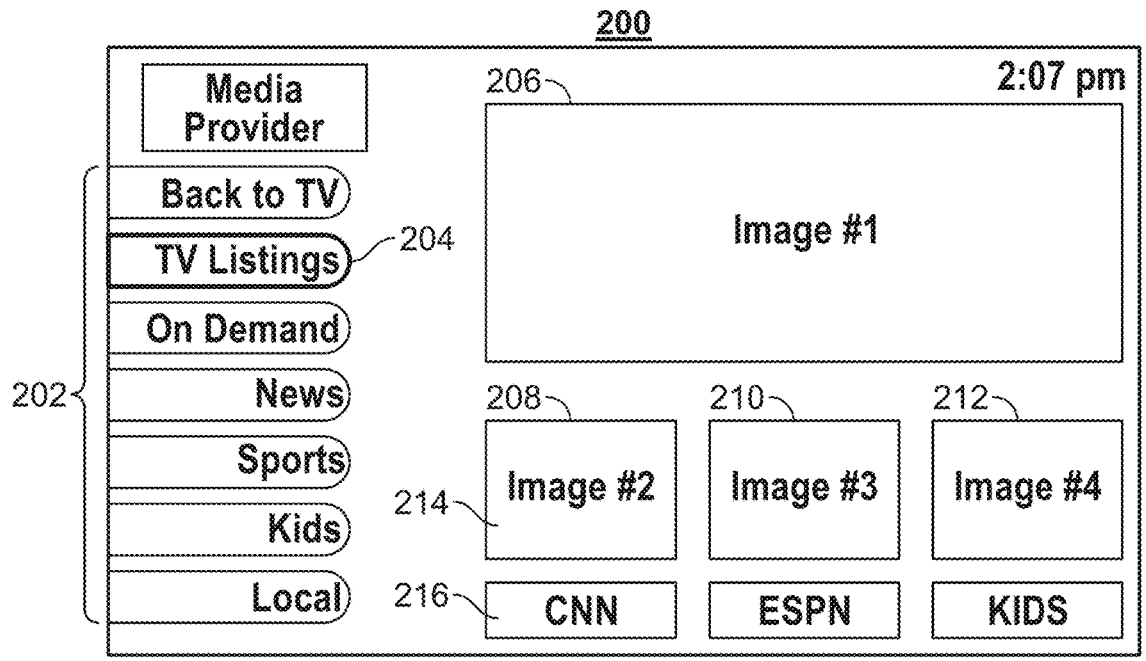
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
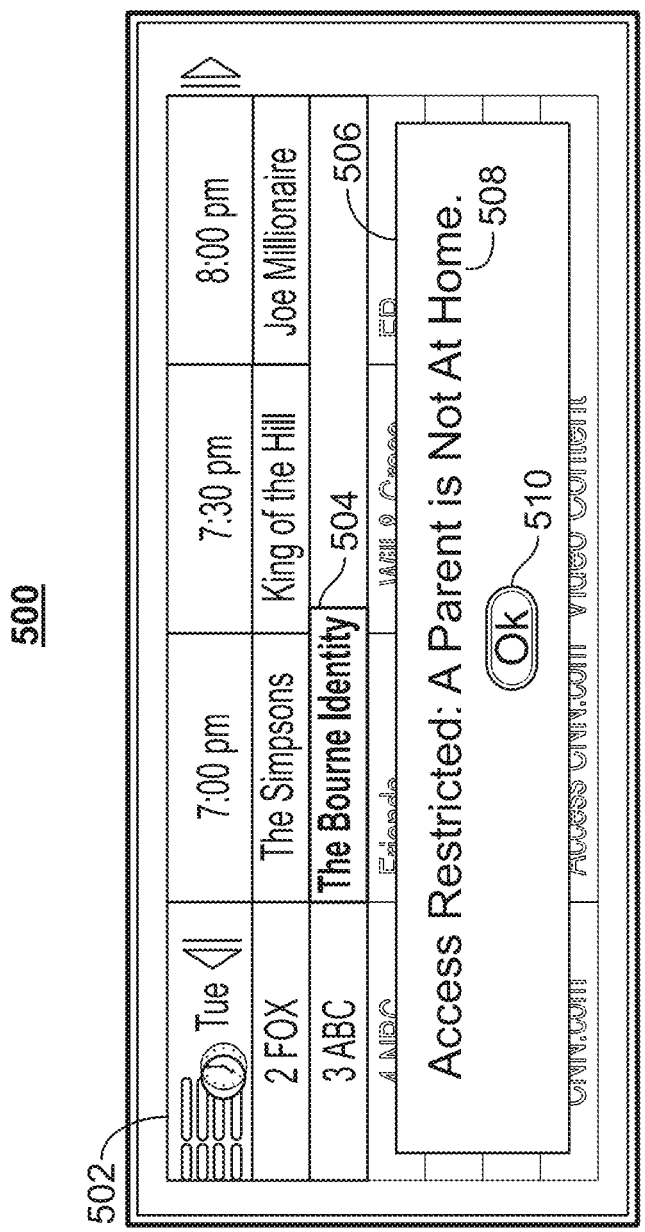
FIG. 5 shows an illustrative embodiment of a display screen that may be used to notify a person consuming media content that access was restricted to a media asset in accordance with some embodiments of the disclosure.

FIG. 5 shows an illustrative example of a display that the media guidance application has generated, via processing circuitry 306 (FIG. 3), in response to a party attempting to access a restricted media asset and based on a user not being in the projected location. For example, the media guidance application may have determined that a user has deviated from his scheduled based on retrieving GPS coordinates from a device associated with the user (e.g., the user's smart phone). If the user's smart phone is in a location that is different from the user's projected location, the media guidance application may determine that the user's location is different then the user's projected location, and modify access restrictions accordingly.

In FIG. 5, the media guidance application generated, via processing circuitry 306 (FIG. 3), display 502 (FIG. 5) including a program listing 504 (FIG. 5) for "The Bourne Identity." The media guidance application may generate for display overlay 506 in response to a selection, via user input interface 310 (FIG. 3) of program listing 504 (FIG. 5). Overlay 506 includes message 508, which indicates that access to the program associated with program listing 504 is restricted based on the user not being in the projected location.

For example, the media guidance application may modify a first level of media access restriction based on a published communication from the user. For example, if access to "The Bourne Identity" was restricted under the first level of media access restriction and subsequently allowed by a modification based on the user's published communication, message 508 may, instead, include a message that indicates that access was granted because the media guidance application was instructed by the user to modify the first level of media access restriction.

In some embodiments, the media guidance application may provide an option (e.g., generated for display on another device) to the user to override the maintaining of the first level of access restriction and in response to the user selecting the option, replace the first level of access restriction with the second level of access restriction. The media guidance application, additionally or alternatively to the notification described above, may generate for display an option for the user to grant access to media assets. In some embodiments, the media guidance application may provide, to the user, an option to modify the second time period and in response to the user selecting the option, modify the second time period for a duration specified by the user. In such cases, the option may require a user to enter a password.

Figure 6:
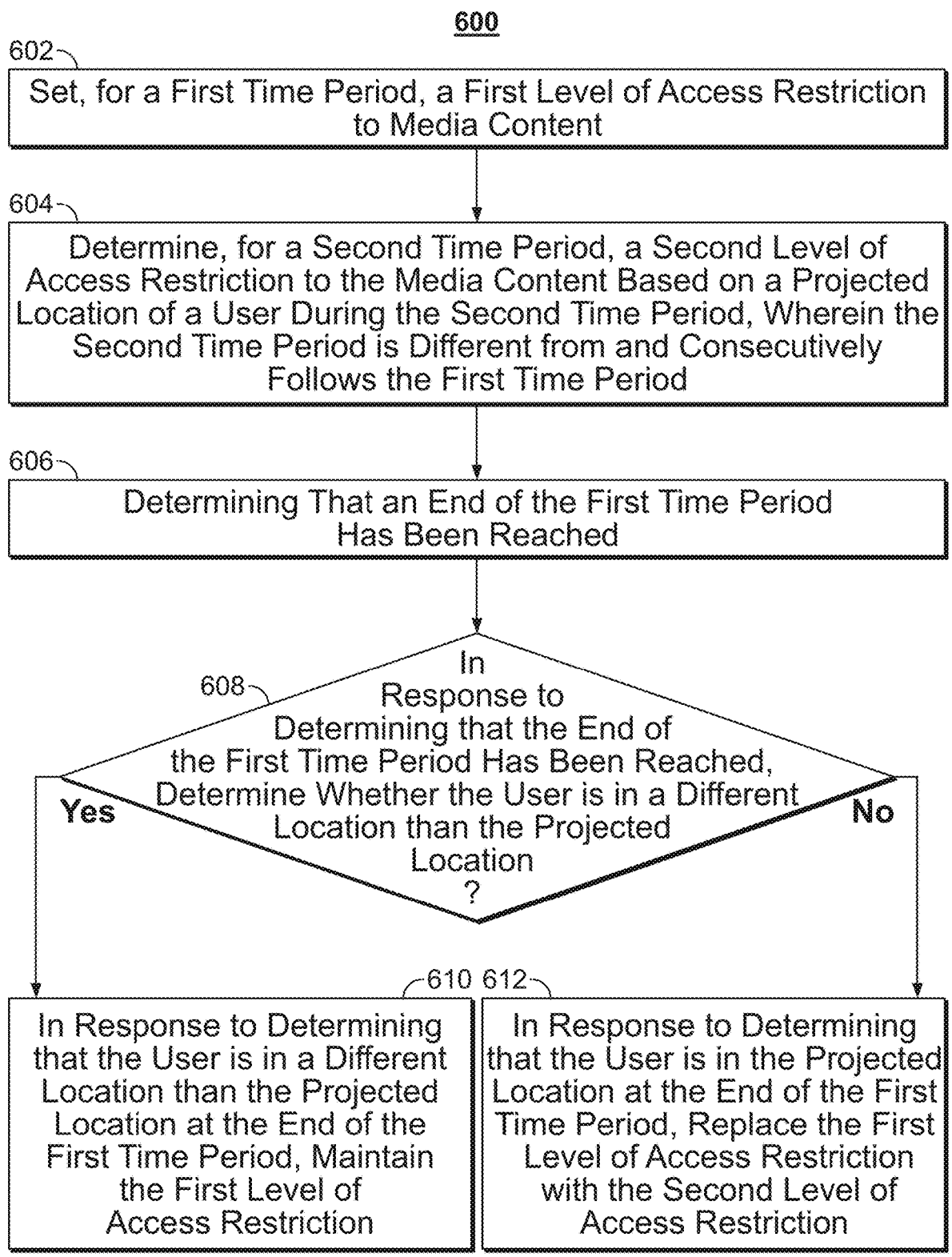
FIG. 6 is a flowchart of illustrative steps involved in modifying access to media content based on the user's projected location in accordance with some embodiments of the disclosure.

FIG. 6 is a flowchart of illustrative steps involved in modifying media access restrictions in a flexible manner based on a deviation in a user's projected location. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7)).

At step 602, the media guidance application sets (e.g., via control circuitry 304 (FIG. 3)) for a first time period, a first level of access restriction to media content. For example, the media guidance application retrieves, via processing circuitry 306 (FIG. 3) from storage 308 (FIG. 3) a list of media assets that must be restricted under the first level of access restriction to media content. Alternatively or additionally, the media guidance application may retrieve a set of criteria associated with the first level of access restriction, in which media assets corresponding to the criteria are blocked. The media guidance application may then monitor (e.g., via control circuitry 304 (FIG. 3)) for attempted access to restricted media assets and if it detects (e.g., via control circuitry 304 (FIG. 3)) attempted access to restricted media assets, it may block access.

At step 604, the media guidance application determines (e.g., via control circuitry 304 (FIG. 3)), for a second time period, a second level of access restriction to the media content based on a projected location of a user during the second time period, wherein the second time period is different from and consecutively follows the first time period. The media guidance application may retrieve from storage 308 (FIG. 3), another list of media assets that must be restricted under the second level of access restriction to the media content. Alternatively or additionally, the media guidance application may retrieve another set of criteria associated with the second level of access restriction, in which media assets corresponding to the criteria are blocked. The media guidance application may determine (e.g., via control circuitry 304 (FIG. 3)), the differences between the first level of access restriction and the second level of access restriction.

At step 606, the media guidance application determines (e.g., via control circuitry 304 (FIG. 3)) that an end of the first time period has been reached. The media guidance application may retrieve (via processing circuitry 306 (FIG. 3)) from storage 308 (e.g., RAM, ROM, etc.) the current time. The media guidance application may repeat this operation every minute. The media guidance application may also retrieve (via processing circuitry 306 (FIG. 3)) from storage 308 (e.g., RAM, ROM, etc.) an end time of the first time period. If the media guidance application determines (e.g., via control circuitry 304 (FIG. 3)) that the two times are the same or if the current time is greater then the end time of the first time period, the media guidance application determines that the first time period has ended.

At step 608, the media guidance application, in response to determining that the end of the first time period has been reached, determines (e.g., via control circuitry 304 (FIG. 3)) whether the user is in a different location than the projected location. The media guidance application may (e.g., via processing circuitry 306) retrieve from storage 308 (FIG. 3) the projected location of the user. The projected location of the user may also be retrieved from a database residing at media guidance data source 418 via communications network 414. The media guidance application may then compare (e.g., via processing circuitry 306) the user's location to the user's projected location. As a result, the media guidance application determines whether the user is in a location different then the user's projected location.

At step 610, the media guidance application, in response to determining that the user is in a different location than the projected location at the end of the first time period, maintains (e.g., via control circuitry 304 (FIG. 3)) the first level of access restriction. If, at step 608, the media guidance application determines that the user is in a different location then the user's projected location, the media guidance application may not execute (e.g., via processing circuitry 306) instructions to set the second level of media access restriction.

At step 612, the media guidance application, in response to determining that the user is in the projected location at the end of the first time period, replaces (e.g., via control circuitry 304 (FIG. 3)) the first level of access restriction with the second level of access restriction. The media guidance application may use the determination of the differences between the first level of media access restriction and the second media access of media access restriction determined at step 604 to replace (e.g., via control circuitry 304 (FIG. 3)) the first media access restriction with the second media access restriction.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
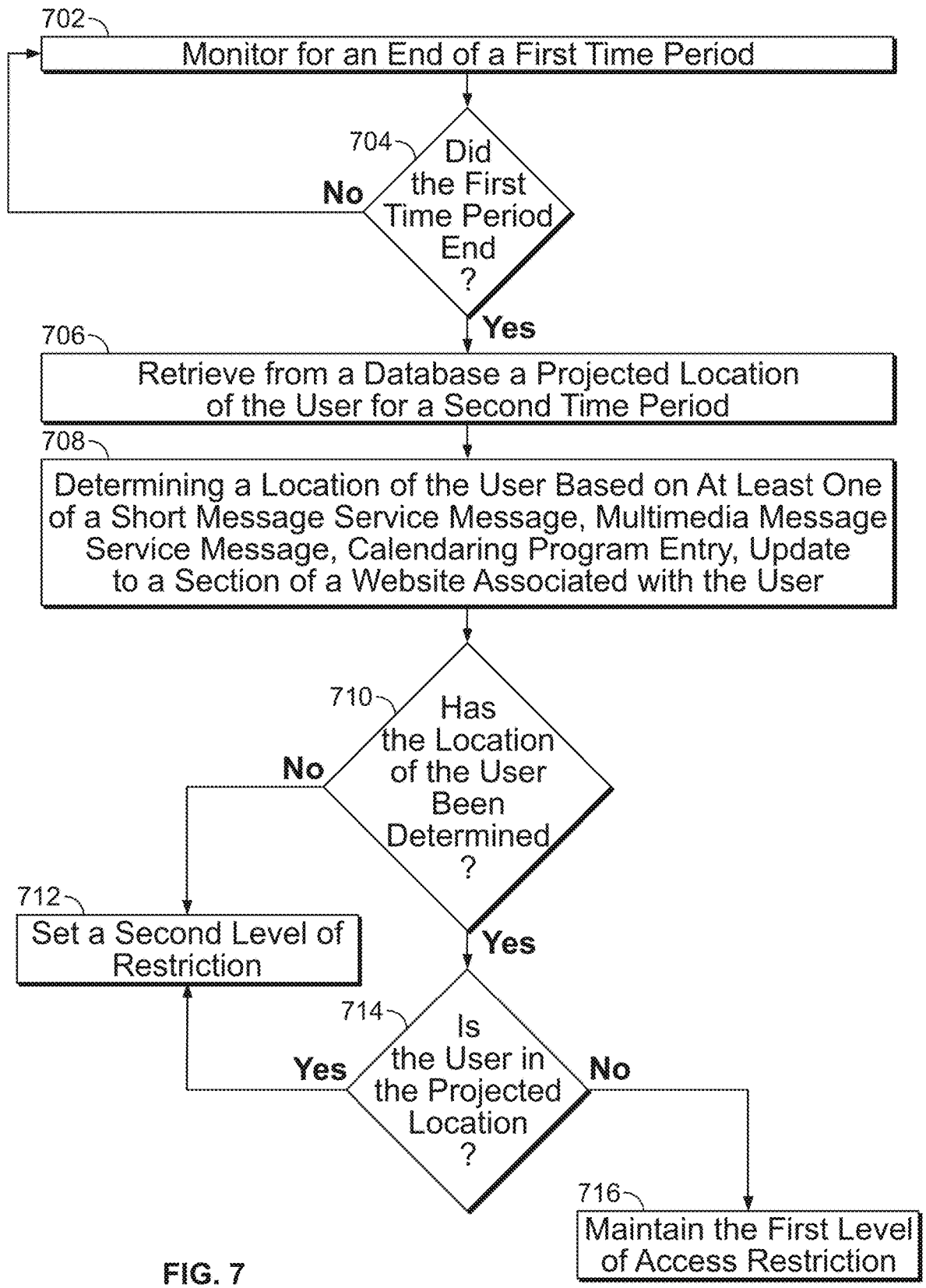
FIG. 7 is a flowchart of illustrative steps involved in determining whether to maintain a first level of media access restrictions or to set a second level of media access restrictions in accordance with some embodiments of the disclosure.

FIG. 7 is a flowchart of illustrative steps involved in determining whether a second level of access restriction needs to be set. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6)).

At step 702, the media guidance application monitors (e.g., via control circuitry 304 (FIG. 3)) for an end of the first time period. The media guidance application may compare (e.g. via control circuitry 304 (FIG. 3)) the current time that it retrieves via processing circuitry 306 (FIG. 3) from storage 308 (FIG. 3) with the end time of the first time period also retrieved via processing circuitry 306 (FIG. 3) from storage 308 (FIG. 3).

At step 704, the media guidance application determines whether the first time period has ended. If the first time period has not ended, the media guidance application moves back to step 702, but if the first time period has ended, the media guidance application continues to step 706. For example, the media guidance application may incorporate or have access to a clock or counter mechanism that determines the current time. The media guidance application (e.g., via control circuitry 304 (FIG. 3)) may continually compare the determined current time to times associated with the access restrictions.

At step 706, the media guidance application retrieves, (e.g. via control circuitry 304 (FIG. 3)) from a database, a projected location of the user for a second time period. The database may be stored on the same device that the media guidance application is active on (e.g., in storage 308 (FIG. 3)). The database may also be stored at media guidance data source 418 (FIG. 3) and retrieved via communications network 414.

At step 708, the media guidance application determines (e.g., via control circuitry 304 (FIG. 3)) a location of the user based on at least one of an SMS message, an MMS message, a calendar program entry, or an update to a section of a website associated with the user. The media guidance application may be active on multiple devices associated with the user. Some of those devices may be used by the user to send SMS and MMS messages. When the user sends or receives an SMS or an MMS message the media guidance application may retrieve the message from the user's device and determine the user's potential location based on the message. The media guidance application may also transmit the message to media guidance data source 418 (FIG. 4) via communications network 414 (FIG. 4). The message may be analyzed at media guidance data source 418 to determine whether it contains the user's potential location. The media guidance application may also retrieve (e.g., via control circuitry 304 (FIG. 3)) calendar items from user's calendar program and analyze the entries for user's potential location. Additionally or alternatively, the media guidance application may retrieve (e.g., via control circuitry 304 (FIG. 3)) updates to a section of website where the section of the website is associated with the user. Both the calendar items and the updates to a section of the website may be transmitted (e.g., via control circuitry 304 (FIG. 3)) to media guidance data source 418 (FIG. 4) for analysis in order to determine the potential location of the user.

At step 710, The media guidance application determines (e.g., via control circuitry 304 (FIG. 3)) if the location of the user has been determined based on user's potential locations. If the location of the user has not been determined, the media guidance application moves to step 712. For example, if the media guidance application cannot determine the location of the user, the media guidance application may not vary from the scheduled access restrictions (i.e., may set the second level of access restriction). If the media guidance application determines (e.g., via control circuitry 304 (FIG. 3)) the user's location it moves to step 714.

At step 712, the media guidance application sets (e.g., via control circuitry 304 (FIG. 3)) a second level of access restriction to media content. The media guidance application may retrieve (e.g., via control circuitry 304 (FIG. 3)) the settings associated with the first level of access restriction to media content and the second level of media access restriction to media content. The media guidance application may compare (e.g., via control circuitry 304 (FIG. 3)) the two levels of media access restriction and apply (e.g., via control circuitry 304 (FIG. 3)) the changes to the media content.

At step 714, the media guidance application determines (e.g., via control circuitry 304 (FIG. 3)) whether the user is in the projected location. Various methods of determining whether the user is in the projected location have been described above. If the media guidance application determines (e.g., via control circuitry 304 (FIG. 3)) that the user is in the projected location, the media guidance application continues to step 712. However, if the media guidance application determines (e.g., via control circuitry 304 (FIG. 3)) that the user is not in the user's projected location, it will continue to step 716, and will maintain (e.g., via control circuitry 304 (FIG. 3)) the first level of access restriction to the media content.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

FIG. 8 is a flowchart of illustrative steps involved in determining whether to modify access restrictions to media content based on user's published communications. It should be noted that process 800 or any step thereof could be performed on, or provided by, any of the devices shown in FIGS. 3-4. For example, process 800 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 800 may be incorporated into or combined with one or more steps of any other process or embodiment (e.g., process 600 (FIG. 6) or process 700 (FIG. 7)).

At step 802, the media guidance application receives (e.g., via control circuitry 304 (FIG. 3)) input from a first user to set a first level of access restriction to media content. The media guidance application may generate for display on display 312 (FIG. 3) options for the first user to pick content that the user desires to restrict under the first level of access restriction. The media guidance application may receive the first user's selections (e.g., via user input interface 310 (FIG.

3)). Once the media guidance application receives the first user's selections it can apply (e.g., via control circuitry 304 (FIG. 3)) the selections.

At step 804, the media guidance application detects (e.g., via control circuitry 304 (FIG. 3)) a communication from the first user, wherein the communication from the first user is published to a second user. As discussed above, the media guidance application may receive an SMS message, an MMS message, a calendar item, an update to a section of a website associated with the user, etc.

At step 806, the media guidance determines (e.g., via control circuitry 304 (FIG. 3)), based on the communication, that the first level of access restriction is to be modified. The media guidance application may analyze (e.g., via control circuitry 304 (FIG. 3)) all the communications sent and received by the user in order to determine whether the first level of access restriction needs to be modified.

At step 808, the media guidance application modifies (e.g., via control circuitry 304 (FIG. 3)), based on the communication, the first level of access restriction. If the media guidance application determines in step 806 that the first level of access restriction to media content needs to be modified it may do so (e.g., via control circuitry 304 (FIG. 3)).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   setting a content access restriction for media content;
   determining a time at which the content access restriction for the media content is to be modified;
   receiving an indication that the time at which the content access restriction is to be modified may be subject to change;
   predicting, based on the indication, an updated time at which the content access restriction is to be modified; and
   modifying the time at which the content access restriction is to be modified based on the predicted updated time.

2. The method of claim 1, wherein receiving the indication that the time at which the content access restriction is to be modified may be subject to change comprises:
   receiving an electronic message comprising at least one of a short message service message, multimedia messaging service message, a message from a calendar application, and an update to a section of a website associated with a user associated with the content access restriction.

3. The method of claim 2, further comprising analyzing at least one of a content of the electronic message and a context of the electronic message.

4. The method of claim 1, wherein the modifying of the time at which the content access restriction is to be modified based on the predicted updated time is performed in response to the predicting, without receiving further user input.

5. The method of claim 1, further comprising:
   causing a notification to be generated for output at a user device of a user associated with the content access restriction,
   wherein the modifying of the time at which the content access restriction is to be modified based on the predicted updated time is performed in response to receiving user selection of the notification.

6. The method of claim 5, wherein the notification comprises an option to delay the time at which the content access restriction is to be modified based on the predicted updated time.

7. The method of claim 5, wherein the notification comprises an indication that content access restriction will be maintained until the predicted updated time.

8. The method of claim 1, wherein:
   the setting of the content access restriction is associated with a first user; and
   the indication that the time at which the content access restriction is to be modified may be subject to change comprises an electronic message indicating that a second user, authorized by the first user to access the media content at a first location, will not be at the first location until a second time that is later than the first time.

9. The method of claim 8, wherein the predicted updated time corresponds to the second time.

10. The method of claim 1, wherein the indication that the time at which the content access restriction is to be modified may be subject to change does not comprise a command to modify the time at which the content access restriction is to be modified.

11. A system comprising:
    storage circuitry;
    control circuitry configured to:
       set a content access restriction for media content, wherein the content access restriction is stored in the storage circuitry;
       determine a time at which the content access restriction for the media content is to be modified;
       receive an indication that the time at which the content access restriction is to be modified may be subject to change;
       predict, based on the indication, an updated time at which the content access restriction is to be modified; and
       modify the time at which the content access restriction is to be modified based on the predicted updated time.

12. The system of claim 11, wherein the control circuitry is configured to receive the indication that the time at which the content access restriction is to be modified may be subject to change by:
    receiving an electronic message comprising at least one of a short message service message, multimedia messaging service message, a message from a calendar application, and an update to a section of a website associated with a user associated with the content access restriction.

13. The system of claim 12, wherein the control circuitry is further configured to analyze at least one of a content of the electronic message and a context of the electronic message.

14. The system of claim 11, wherein the control circuitry is configured to modify the time at which the content access restriction is to be modified, based on the predicted updated time, in response to the predicting, without receiving further user input.

15. The system of claim 11, wherein the control circuitry is further configured to:
cause a notification to be generated for output at a user device of a user associated with the content access restriction,
wherein the control circuitry is configured to modify the time at which the content access restriction is to be modified, based on the predicted updated time, in response to receiving user selection of the notification.

16. The system of claim 15, wherein the notification comprises an option to delay the time at which the content access restriction is to be modified based on the predicted updated time.

17. The system of claim 15, wherein the notification comprises an indication that content access restriction will be maintained until the predicted updated time.

18. The system of claim 11, wherein:
the setting of the content access restriction is associated with a first user; and
the indication that the time at which the content access restriction is to be modified may be subject to change comprises an electronic message indicating that a second user, authorized by the first user to access the media content at a first location, will not be at the first location until a second time that is later than the first time.

19. The system of claim 18, wherein the predicted updated time corresponds to the second time.

20. The system of claim 11, wherein the indication that the time at which the content access restriction is to be modified may be subject to change does not comprise a command to modify the time at which the content access restriction is to be modified.

* * * * *